United States Patent
Denenberg et al.

(10) Patent No.: US 6,724,864 B1
(45) Date of Patent: Apr. 20, 2004

(54) ACTIVE PROMPTS

(75) Inventors: Larwrence A. Denenberg, Brookline, MA (US); Daniel L. Franklin, Melrose, MA (US); Stephen P. Gildea, Somerville, MA (US); Marc J. Neuberger, Arlington, MA (US); Daniel E. Ottenheimer, Arlington, MA (US)

(73) Assignee: Comverse, Inc., Wakefield, MA (US)

( * ) Notice: Subject to any disclaimer, the term of this patent is extended or adjusted under 35 U.S.C. 154(b) by 0 days.

(21) Appl. No.: 09/488,177

(22) Filed: Jan. 20, 2000

(51) Int. Cl.⁷ ............................................... H04M 11/00
(52) U.S. Cl. ................. 379/88.16; 379/88.25; 379/88.27
(58) Field of Search .............. 379/88.05, 88.06, 379/88.07, 88.13, 88.14, 88.16, 88.22; 704/258, 260, 267, 270; 700/1, 13, 14

(56) References Cited

U.S. PATENT DOCUMENTS

| | | | | |
|---|---|---|---|---|
| 5,255,305 A | * | 10/1993 | Sattar ...................... 379/32.01 |
| 5,367,609 A | * | 11/1994 | Hopper et al. .............. 704/278 |
| 5,412,712 A | * | 5/1995 | Jennings .................. 379/88.05 |
| 5,488,650 A | * | 1/1996 | Greco et al. ............. 379/88.22 |
| 5,493,606 A | * | 2/1996 | Osder et al. ............. 379/88.05 |
| 5,946,377 A | * | 8/1999 | Wolf ....................... 379/88.22 |
| 6,058,166 A | * | 5/2000 | Osder et al. ............. 379/88.22 |
| 6,317,492 B1 | * | 11/2001 | Johnson ................. 379/201.03 |

* cited by examiner

Primary Examiner—Roland Foster
(74) Attorney, Agent, or Firm—Wolf, Greenfield & Sacks, P.C.

(57) ABSTRACT

Method and apparatus are provided for generating a prompt stream in a telephony system. At least one voice prompt associated with at least one audio stream to be played to a user of the telephony system is inserted into the prompt stream. Also inserted into the prompt stream is at least one active prompt associated with computer program instructions to be executed when the prompt stream is processed. Also provided are method and apparatus for processing the prompt stream. The at least one audio stream associated with the at least one voice prompt is played to the user, and the computer program instructions associated with the at least one active prompt are executed.

88 Claims, 9 Drawing Sheets

ACTIVE PROMPTS

FIELD OF THE INVENTION

The present invention is directed to a method and apparatus for processing prompt streams in a telephony system and, more specifically, to a method and apparatus for processing prompt streams including computer program instructions.

DESCRIPTION OF THE RELATED ART

A variety of automated systems have been developed that interact with people over the telephone. For example, commercial services exist that provide automated stock quotes and other financial information over the telephone. Such telephony systems implement a sequence of dialogs between a person (the "user") on one end of the telephone connection, and the automated telephony system on the other end of the telephone connection. The telephony system plays audio output to the user. This output may, for example, consist of recorded announcements, tones or other generated sounds, or synthesized speech generated by a "text-to-speech" engine. A single unit of such audio output is referred to as a "prompt." The automated system conveys information to the user by "playing" a sequence of prompts (referred to as a "prompt stream") in an appropriate order. For example, to convey the sentence "A message was received from John Smith at 10:15 today," the system might play the following prompts in order: (1) a recording of the words "A message was received from," (2) synthesized speech for the name "John Smith" generated by a text-to-speech engine, (3) a recording of the word "at," (4) a recording of the word "ten," (5) a recording of the word "fifteen," and (6) a recording of the word "today."

The user is typically allowed to respond to the telephony system in any of a variety of ways, such as by pressing one or more DTMF (touch tone) keys, by hanging up, by flashing the telephone switchhook, or, in a system that is capable of speech recognition, by speaking or making other noises that are recognizable by the system. The user may also do nothing, leading to what is referred to as a "timeout." In a typical interaction, the dialog implemented by the telephony system consists of alternating actions by the user and the system; e.g., the system plays a prompt stream, the user responds, the system plays another prompt stream based on the user's response, and so forth, until either the user or the system terminates the dialog by hanging up. Note that in some cases a hang up by the user may not be voluntary, such as when a cellular phone connection is unexpectedly dropped due to interference or some other problem with the connection.

Some telephony systems allow the user to interrupt the system's audio output. Such an interruption is referred to as "barge-in" (also referred to as "cut-through"). This feature may be used to provide a more user-friendly interface. For example, a user who is already familiar with the operation of the telephony system can barge-in on the prompt stream to respond without waiting for the prompt stream to complete, making dialogs complete more quickly and feel more natural to the user. Some telephony systems allow barge-in to be turned on or off by the system or by the user as desired. Some systems allow the user to barge-in with DTMF but not with voice input. Hang up by the user while a prompt stream is playing is also typically considered to be a form of barge-in.

Conventional automated telephony systems are typically controlled by software that is designed to operate in accordance with the "prompt queue" model. In such a model, the application program that controls the telephony system sequentially stores prompts in a prompt queue (a first-in first-out list). The telephony system typically provides a software interface through which the application program can manage the prompt queue. The software interface typically provides a variety of methods for adding prompts to the prompt queue. For example, the interface typically allows the application to supply a text string to be added to the prompt queue, in which case a text-to-speech engine converts the text string into a digital audio stream that is added to the prompt queue in the form of an audio file. The interface may also allow the application program to supply an audio file to be added directly to the prompt queue. Regardless of the method that the application program uses to add prompts to the prompt queue, all prompts stored in the prompt queue are typically stored in the form of audio files suitable for playback to the user. The telephony system's software interface also typically provides a method for playing the prompts in the prompt stream. The application program uses this method to sequentially play the prompts in the prompt queue. The prompts are played to the user over the telephone and removed from the prompt queue as they are being played.

The prompt queue model provides a simple interface to the telephony system that makes it easy for the application program to generate and play prompts to the user. The application programmer who develops an application program according to the prompt queue model need not know how the underlying components, such as the text-to-speech engine and the speech recognition engine, work. Rather, the application programmer need merely know how to use some straightforward commands for manipulating the prompt queue (e.g., commands to add prompts to the prompt queue) and for causing the prompts in the prompt queue to be played to the user. The telephony system's software interface shields the application program (and the application programmer) from communication with low-level components such as the text-to-speech engine, the speech recognition engine, and the audio hardware.

Conventional systems using the prompt queue model, however, have a number of problems, some of which result at least in part from the abstraction provided by the prompt queue model. For example, in such a system, it is difficult to design an application program to perform an action at a predetermined time during playing of the prompt stream to the user. Once an application program instructs the telephony system to play the prompts in a prompt queue, the telephony system plays the prompts without further intervention from the application program. Furthermore, the telephony system does not provide the application program with any information about the time at which a particular prompt in the prompt queue is played to the user. It is therefore difficult for the application program to determine precisely when a particular word, for example, in the prompt stream is being played. This can make it difficult for the application program to perform an action that must be performed at a particular time while the prompt stream is playing. One reason for this difficulty is that, as described above, the application program can provide prompts in the form of text strings which are converted into audio by a text-to-speech engine. Once the text in such prompts is converted to speech, the application program does not have any information about the temporal position of particular words within the prompt.

Similarly, it is difficult to design application programs for such systems which can accurately and reliably determine when an event occurred during playing of a prompt stream. For example, it is difficult to design application programs that can accurately and reliably determine when a user barged in with input (such as a DTMF keypress) during playing of a prompt stream. Furthermore, even if the application program is provided with the time at which barge-in occurred, it may be difficult for the application program to determine which prompt was being played at the time of barge-in.

More generally, it is difficult to guarantee that application programs in such systems will perform as desired in the face of the wide variety of asynchronous interactions that may occur between the prompt stream, the user, and external events. Such asynchronous events include, for example, any events that occur at unpredictable times, such as barge-in or the arrival of a new e-mail message addressed to the user. For example, in many cases where barge-in is available, the desired behavior of the system changes when barge-in occurs. Furthermore, the correct behavior of the system may depend upon the precise instant at which the barge-in occurred. For example, it may be necessary for the system to repeat a critical message that was not played in its entirety because the user interrupted it by barging in. Although some systems attempt to solve this problem by disallowing barge-in during such messages, it is still necessary to detect an unexpected hang up in such a situation.

Asynchronous events from outside the system can affect the desired behavior of the system in complex ways. For example, consider a voice-controlled messaging system in which the user is allowed to speak commands such as "next message" and "save message." In such a system, messages from outside the system may arrive at any time. Suppose that when a new message arrives, the desired behavior of the system is to (a) wait until the user hears the end of the prompt currently being played, (b) play "A new message has arrived; do you wish to hear it now?", and then (c) get a yes/no reply from the user and take appropriate action in response.

Implementing this desired behavior is complicated by the fact that the user may barge-in with another command before step (b) has been performed. Suppose, for example, that the user is listening to a prompt stream when the new message arrives, but before hearing the end of the prompt stream the user barges in by saying "tell me the time." Although it would be possible to simply notify the user about the new message instead of playing the time, it might be more desirable to inform the user of the current time, deferring notification about the new message until later. For example, it might be desirable for the system to say: "The time is now 6:45. A new message has arrived . . . ".

The situation is further complicated by the requirements of typical speech recognizers, which need to be pre-loaded with a description of all commands that the user is permitted to say at a particular time. Such a description of all permissible commands is referred to as a "grammar." In this example, it is desirable for the grammar to contain all standard user commands ("e.g., "next message") up to the instant at which the system reports the new message, at which point the grammar must be modified to additionally accept the possibilities "yes" and "no." In other words, to implement the desired behavior it is desirable to change grammars at a particular point in time while the prompt stream is playing. As described above, in conventional systems it is difficult to design application programs to perform actions at a particular point in time while the prompt stream is playing.

What is needed, therefore, is a system that facilitates development of application programs, for use in telephony systems, that can handle a variety of asynchronous interactions between the system, the user, and external events.

SUMMARY

One illustrative embodiment of the present invention is directed to a method for use in a telephony system. The method includes acts of: (A) inserting into a prompt stream at least one voice prompt to be played to a user of the telephony system when the prompt stream is processed; and (B) inserting into the prompt stream at least one active prompt associated with computer program instructions to be executed when the prompt stream is processed.

Another illustrative embodiment of the present invention is directed to a method for processing a prompt stream in a telephony system. The method includes acts of: (A) playing a first audio stream associated with a first voice prompt in the prompt stream; and (B) executing computer program instructions associated with at least one active prompt in the prompt stream.

A further illustrative embodiment of the present invention is directed to a computer-readable medium encoded with a program for execution on a host computer in a telephony system. The program, when executed on the host computer, performs a method including acts of: (A) inserting into a prompt stream at least one voice prompt to be played to a user of the telephony system when the prompt stream is processed; and (B) inserting into the prompt stream at least one active prompt associated with computer program instructions to be executed when the prompt stream is processed.

Yet another illustrative embodiment of the present invention is directed to a computer-readable medium encoded with a program for execution on a host computer in a telephony system. The program, when executed on the host computer, performs a method for processing a prompt stream in the telephony system. The method includes acts of: (A) playing a first audio stream associated with a first voice prompt in the prompt stream; and (B) executing computer program instructions associated with at least one active prompt in the prompt stream.

Another illustrative embodiment of the present invention is directed to a telephony system including a storage device to store a prompt stream including a stream of prompts; and a controller to insert into the prompt stream at least one voice prompt to be played to a user of the telephony system when the prompt stream is processed, and to insert into the prompt stream at least one active prompt associated with computer program instructions to be executed when the prompt stream is processed.

Yet another illustrative embodiment of the present invention is directed to a telephony system including a storage device to store a prompt stream including a stream of prompts; and a controller to play a first audio stream associated with a first voice prompt in the prompt stream, and to execute computer program instructions associated with at least one active prompt in the prompt stream.

DETAILED DESCRIPTION

Figure 1:
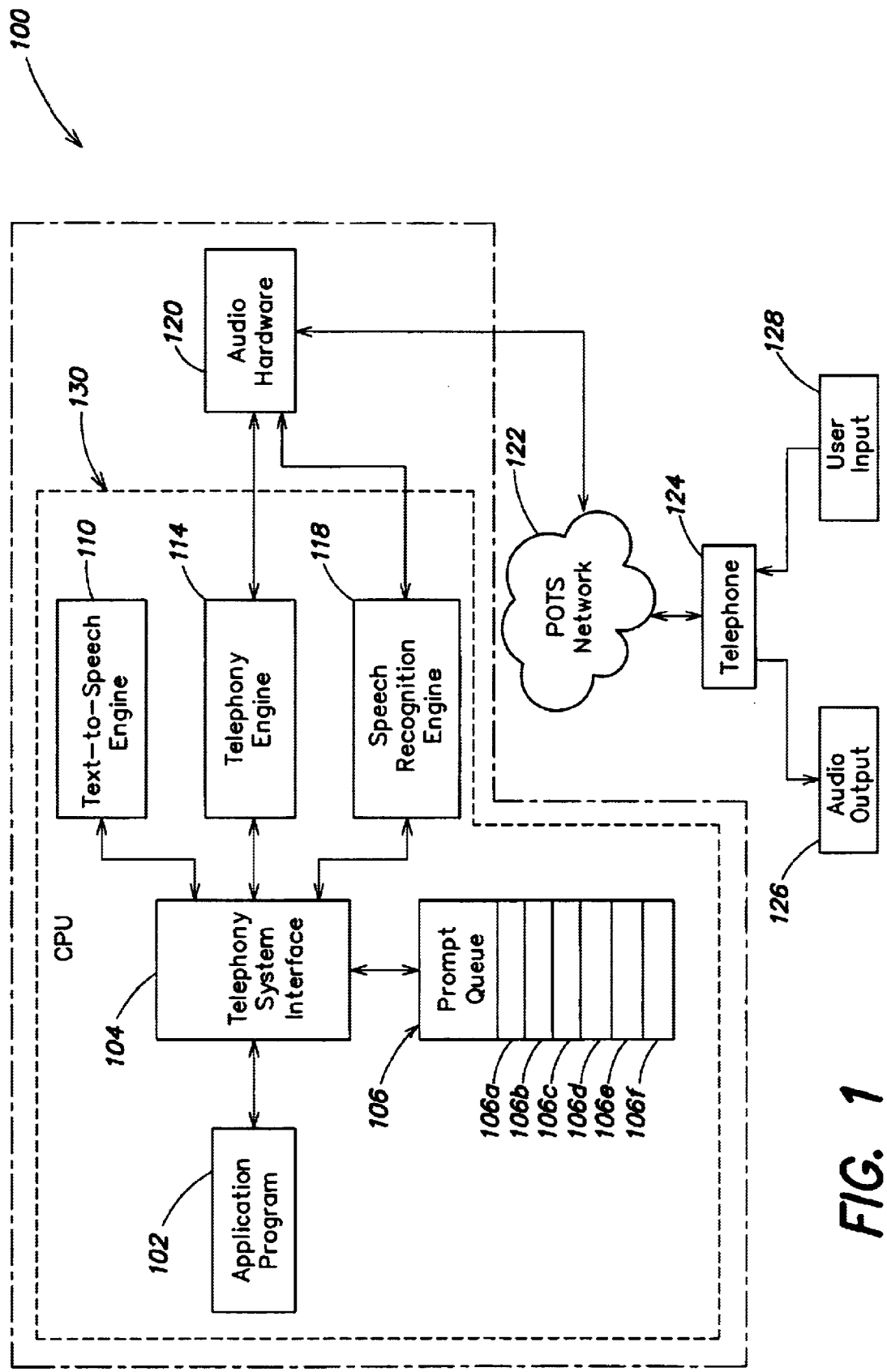
FIG. 1 is a block diagram of a telephony system including active prompts according to one embodiment of the present invention.

One aspect of the present invention is directed to an "active" prompt in a prompt stream of a telephony system. As described above, traditional prompts (referred to herein as "voice prompts") are associated with an audio stream (such as spoken words) typically represented in a digital form and stored in a digital audio file. An active prompt, in contrast, is associated with computer program instructions. An active prompt may be inserted into a prompt stream by an application program in the same way as a voice prompt. A prompt stream may contain any combination of voice prompts and active prompts in any order. When the application program instructs the telephony system to process the prompt stream, the telephony system processes each prompt (which may be either a voice prompt or an active prompt) in the order in which it was inserted into the prompt stream. If the prompt being processed is a voice prompt, the telephony system plays the audio stream associated with the voice prompt. If the prompt being processed is an active prompt, the telephony system executes the computer program instructions associated with the active prompt.

The following description uses certain terms in the following ways. An application program is said to "insert" (voice and active) prompts into a prompt stream and to "store" (voice and active) prompts in a prompt queue. To cause the prompts in a prompt queue to perform their intended functions (i.e., to play an audio stream in the case of a voice prompt and to execute computer program instructions in the case of an active prompt), the application program instructs the telephony system to "process" the prompt queue. The telephony system processes a voice prompt by "playing" the voice prompt (i.e., playing the audio stream associated with the voice prompt or generating signals corresponding to the audio stream). The telephony system processes an active prompt by "executing" the active prompt or executing the computer program instructions associated with the active prompt. The term "prompt" without the modifier "voice" or "active" is used to refer generically to a prompt that may be either a voice prompt or an active prompt.

Use of active prompts facilitates implementation of a variety of features in automated telephony systems. One advantageous property of active prompts is that an active prompt is guaranteed to execute at a known point in the prompt stream. More specifically, an active prompt is guaranteed to execute after processing of the preceding prompt in the prompt stream has completed and before processing of the subsequent prompt in the prompt stream has begun. As described in more detail below, this guarantee enables implementation of features that require actions to be performed at a particular point in the prompt stream, such as before or after a particular prompt in the prompt stream has been processed. As described above, in conventional systems based on the prompt queue model, it is difficult to design application programs that can accurately and reliably perform an action at a predetermined point in the prompt stream or determine the precise time at which an event occurred during processing of the prompt stream. Active prompts enable both of these capabilities and therefore provide a significant advantage over such systems. A variety of other features and benefits of active prompts will be described in more detail below.

FIG. 1 is a block diagram of an illustrative automated telephony system 100 in which active prompts can be employed in one embodiment of the present invention. It should be appreciated that the system 100 is shown merely as an example of the type of system in which active prompts can be employed, but that the invention is not limited in this respect. Active prompts may be employed in numerous systems other than the automated telephony system 100 shown in FIG. 1. In the system of FIG. 1, an application program 102 includes computer program instructions for interacting with a user over a telephone connection. The application program 102 executes on a central processing unit (CPU) 130 and is stored in a computer-readable memory. For example, the application program 102 may include instructions for playing a greeting to the user when the user places a telephone call to the telephony system 100 and for receiving, interpreting, and responding to input provided by the user. The application program 102 may provide any of a number of services or perform any of a number of functions, such as providing an interface to a voicemail system or providing automated stock quotes or other financial information.

The application program 102 interacts with the other elements of the telephony system 100 through a telephony system interface 104. The telephony system interface 104 provides tools that the application program 102 can use, for example, to insert prompts into a prompt queue 106 and to process the prompt queue 106. Other tools provided by the telephony system interface 104 are described in more detail below. For example, to play a sequence of voice prompts (i.e., a prompt stream) to the user, the application program 102 instructs the telephony system interface 104 to insert each of the voice prompts in the prompt queue 106 (which is initially empty) in the order in which they are to be played to the user. When the application program 102 finishes providing prompts to the telephony system interface 104, the application program 102 instructs the telephony system interface 104 to load a speech recognition engine 118 with a selected grammar, turn on the speech recognition engine 118 with barge-in enabled, and process the prompt queue 106. The telephony system interface 104 then processes the prompt queue 106. As shown in FIG. 1, the telephony system interface 104, the prompt queue 106 and the speech recognition engine 118, along with other components 110 and 114 of the telephony system 100, can also be implemented in software that executes on the CPU 130.

The application program 102 is described herein as "inserting" prompts into the prompt queue 106. It should be appreciated that in the illustrative embodiment shown in FIG. 1, the application program inserts prompts into the prompt queue 106 indirectly through the telephony system interface 104. It should be appreciated that in other embodiments the application program 102 may directly insert prompts into the prompt queue 106, and that the term "insert" as used herein encompasses both direct and indirect insertion. Furthermore, it should be appreciated that elements other than the application program 102, such as the telephony system interface 104, may directly or indirectly insert prompts into the prompt queue 106.

Figure 2:
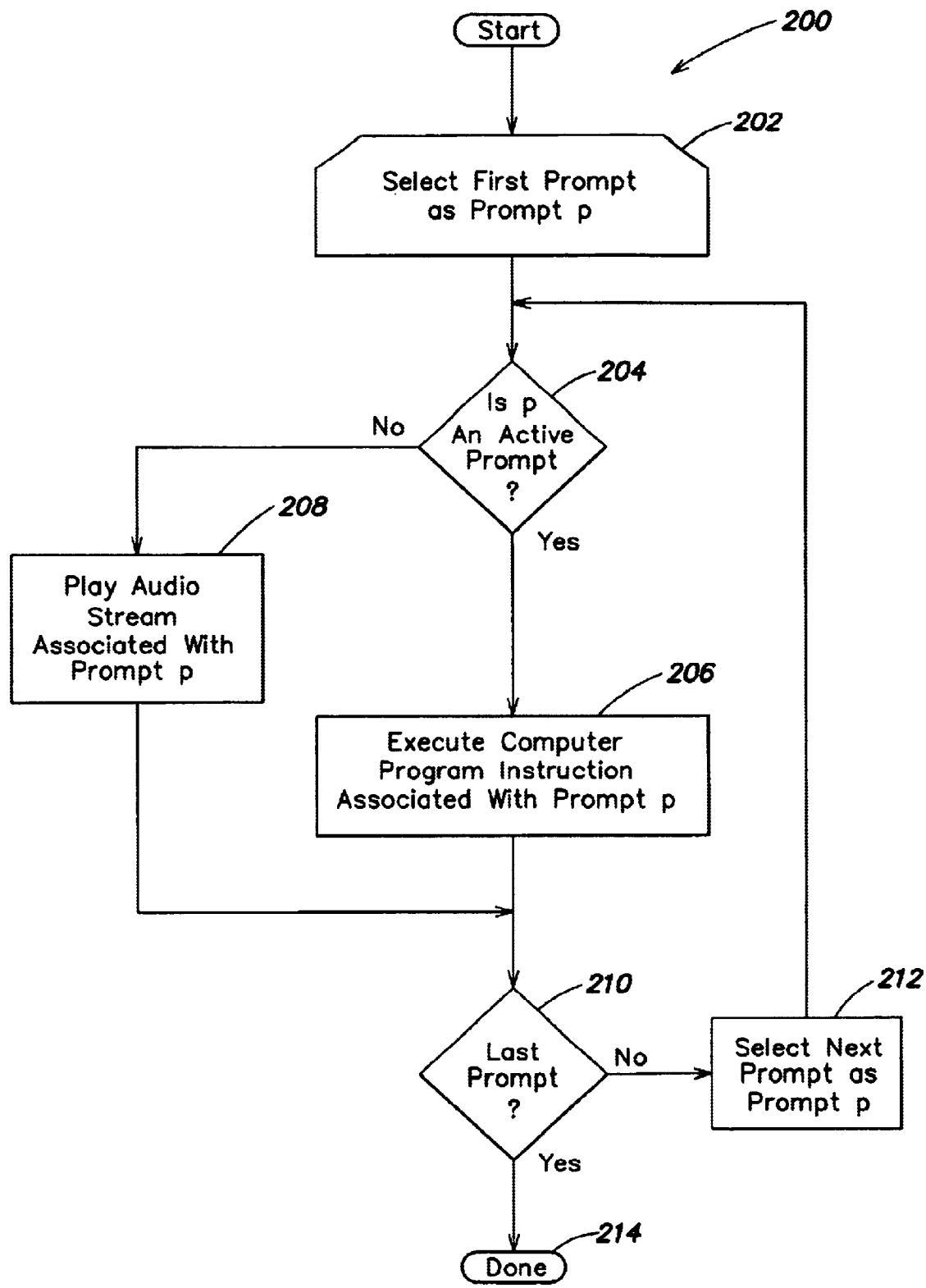
FIG. 2 is a flow chart of a method for processing a prompt queue including active prompts according to one embodiment of the present invention.

Referring to FIG. 2, an example of a process 200 that may be performed by the telephony system interface 104 to process the prompt queue 106 is shown. The telephony system interface 104 selects the first prompt in the prompt queue 106 as prompt p (act 202), and then determines whether the prompt p is an active prompt (act 204). An example of a way in which the telephony system interface 104 may make this determination is described below with respect to FIGS. 3A and 3B. If the prompt p is an active prompt, the telephony system interface 104 executes the computer program instructions associated with the prompt p (act 206). The telephony system interface 104 may, for example, execute the computer program instructions on a central processing unit 130. If the prompt p is not an active prompt (e.g., if the prompt p is a voice prompt), the telephony system interface 104 plays the audio stream associated with the prompt p (act 208), in a manner described in more detail below. If prompt p is not the last prompt in the prompt queue (act 210), the telephony system interface 104 selects the next prompt in the prompt queue as prompt p (act 212) and returns to act 204. If prompt p is the last prompt in the prompt queue (act 210), processing of the prompt queue 106 is complete (act 214).

When the telephony system interface 104 processes the prompt queue 106 with barge-in enabled, the speech recognition engine 118 may inform the telephony system interface 104 at any time that the user has begun speaking (i.e., barged-in). In one embodiment of the present invention, when the telephony system interface 104 receives such a notification, the telephony system interface 104 stops playing the voice prompt that is currently being played and discards the remainder of the prompts in the prompt queue 106. The remainder of the prompts in the prompt queue 106 are discarded in preparation for placing the telephony system's response to the user in the prompt queue 106. When the speech recognition engine 118 finishes recognizing the user's speech, the telephony system 104 returns the result of the speech recognition (which may, for example, be text corresponding to a spoken utterance, a DTMF key, or a hang up indication) to the application program 102 for any additional processing. In one embodiment of the present invention, the telephony system interface 104 also provides the application program 102 with an indication of the amount of time that the current voice prompt had been playing when barge-in occurred by setting a timer at the beginning of each prompt and returning the value of the timer to the application program at the moment barge-in occurred.

In one embodiment of the present invention, active prompts may provide information to the application program 102 upon execution. For example, an active prompt may perform a calculation and provide the result of the calculation to the application program 102 through the telephony system interface 104 as a return value. The telephony system interface 104 may use this information in any manner, such as to determine whether to perform a particular action. For example, an active prompt may provide information to the telephony system interface 104 indicating that processing of the prompt queue 106 should be aborted, e.g., in response to an external event, the elapse of a predetermined amount of time, or for any other reason that the application program 102 might desire. In response, the telephony system interface 104 may abort processing of the prompt queue 106, discard the remainder of the prompt queue and abort the system recognizer which is actively waiting for a response or barge in from the user (as if the user had barged in). For example, when the prompt queue is processed by the process 200 shown in FIG. 2, computer program instructions executed at step 206 can cause the process to terminate, without proceeding to step 210, such that the processing of the prompt queue 106 can be aborted. After performing this action, the system may provide information to the application program 102, such as an indication that processing of the prompt queue has been aborted.

Figure 3A:
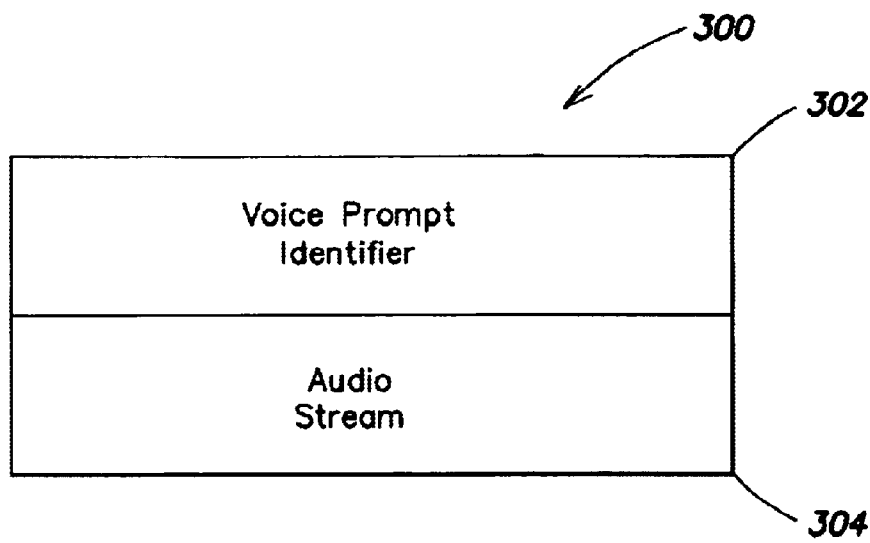
FIG. 3A is a block diagram of a data structure for storing a voice prompt according to one embodiment of the present invention.

Referring to FIG. 3A, an example of a data structure 300 that may be used to represent a voice prompt is shown in block diagram form. The data structure 300 includes a voice prompt identifier 302 that identifies the data structure 300 as a voice prompt. The voice prompt identifier 302 may be used, for example, by the telephony system interface 104 in act 204 (FIG. 2) to determine whether a prompt in the prompt queue 106 is a voice prompt or an active prompt. The data structure 300 also includes an audio stream 304 representing the audio associated with the voice prompt. The audio stream may be stored in any of a variety of audio formats.

Figure 3B:
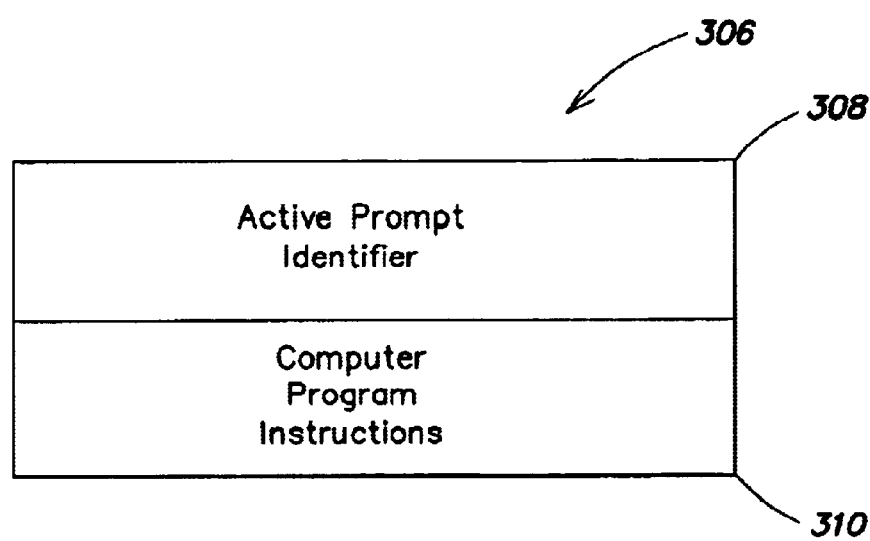
FIG. 3B is a block diagram of a data structure for storing an active prompt according to one embodiment of the present invention.

Referring to FIG. 3B, an example of a data structure 306 that may be used to represent an active prompt is shown in block diagram form. The data structure 306 includes an active prompt identifier 308 that identifies the data structure 306 as an active prompt. The active prompt identifier 308 may be used, for example, by the telephony system interface 104 in act 204 (FIG. 2) to determine whether a prompt in the prompt queue 106 is a voice prompt or an active prompt. The data structure 306 also includes computer program instructions 310 to be executed when the active prompt is processed. The computer program instructions may be represented in any of a variety of formats. For example, the computer program instructions may be represented as source code, in tokenized form, or as executable machine language.

The various elements of the telephony system 100 shown in FIG. 1 will now be described in more detail. As mentioned above, the specific elements shown in FIG. 1, and the descriptions of them below, are provided merely for illustrative purposes, as the present invention is not limited to use with any particular telephony system. The present invention can be used with numerous other types of telephony system, including those that do not employ each of the components shown in FIG. 1, and systems wherein the components are interconnected differently (e.g., the application program 102 need not communicate with the components 110, 114 and 118 via the system interface 104, and can communicate with one or more of these components directly). A telephony engine 114 converts voice prompts into an audio stream suitable for playback by audio hardware 120. When the application program 102 instructs the telephony system interface 104 to process the prompt queue 106, the telephony system interface 104 sequentially reads prompts 106*a–f* from the prompt queue 106 as described above with respect to FIG. 2, and instructs the telephony engine 114 to play each of the voice prompts identified in the prompt queue 106. The telephony engine 114 converts the identified voice prompts into a form suitable for output to the audio hardware 120, which generates and transmits signals corresponding to the identified voice prompts to a telephone 124 over a network 22, such as a Plain Old Telephone Service (POTS) network. The telephone 124 generates audio output 126 corresponding to the identified voice prompts to play them to the user. The audio output 126 may be any form of audio output, and also may include video output for conveying prompt streams to a user, such as a closed caption in a video signal, or text displayed within a frame of a videoconferencing signal. Again, it should be appreciated that the present invention is not limited to use with any particular implementation of the telephone 124 or the telephone network 122, both of which may be implemented in numerous ways. For example, the telephone network 122 may be any kind of communications link or network, such as an internet (e.g., the public Internet), intranet, Internet Protocol telephone network, or wireless network.

The application program 102 may provide prompts to the prompt queue interface 106 to be stored in the prompt queue 106 in a variety of formats. For example, the application program 102 may provide a prompt to the telephony system interface 104 as a digital audio file, in which case the telephony system interface 104 may store the digital audio file directly in the prompt queue 106. The application program 102 may also provide a prompt to the telephony system interface 104 as a text string, in which case the telephony system interface 104 may instruct a text-to-speech engine 110 to convert the text string into a corresponding digital audio stream which may be stored as a voice prompt in the form of a digital audio file in the prompt queue 106.

The telephony system 100 receives user input 128 from the user through the telephone 124 over the telephone network 122. The user input 128 may take any of a variety of forms, such as DTMF (touch tone) keypresses, natural or synthesized speech, or text. The audio hardware 120 receives the user input from the telephone network 122. When the user input 128 takes the form of DTMF keypresses, the audio hardware 120 forwards the user input 128 to the telephony engine 114, which converts the keypresses into symbols representing the keys on the telephone keypad that the user pressed, and forwards the symbols to the application program 102 through the telephony system interface 104.

If the application program 102 wishes to accept user input in the form of speech, the application program 102 typically instructs the speech recognition engine 118 to begin speech recognition just prior to instructing the telephony system interface 104 to begin processing the prompt queue 106. The application program 102 may also provide the speech recognition engine 118 with a grammar (not shown), which includes a vocabulary of words for the speech recognition engine 118 to recognize. Conventional speech recognition engines only recognize words that are within their current grammar. Speech recognition engines typically indicate that speech that does not sufficiently match any words in the current grammar is unrecognizable. When the user input 128 takes the form of speech, the audio hardware 120 forwards the user input to the speech recognition engine 118, which attempts to recognize the user input 128 based on the speech recognition engine's current grammar. The speech recognition engine 118 provides output (typically in the form of a list of words and associated probabilities indicating how likely it is that the words correspond to the words spoken by the user) to the application program 102 through the telephony system interface 104.

The telephony system interface 104 provides the application program 102 with the ability to turn barge-in on or off. When barge-in is turned on, receipt of user input 128 during processing of the prompt queue 106 will cause the telephony system interface 104 to terminate processing of the prompt queue 106, discard the remaining (unprocessed) prompts in the prompt queue 106, and return the processed user input (i.e., either the results of recognizing the user's speech or values corresponding to the keys pressed by the user) to the application program 102. When barge-in is turned off, the user input 128 is ignored during processing of the prompt queue 106. It should be appreciated that the system 100 shown in FIG. 1 is shown purely for purposes of example, and that active prompts may be used in systems that allow barge-in, systems that do not allow barge-in, and systems that allow barge-in to be turned on or off.

As described above, an active prompt may be associated with any computer program instructions specified by the application program 102. As described above, when the telephony system interface 104 processes the prompt queue 106 and encounters an active prompt, the telephony system interface 104 executes the computer program instructions associated with the active prompt. The instructions may, for example, be executed on a central processing unit (CPU) 130 accessible to the telephony system interface 104. Although any computer program instructions may be associated with an active prompt, any computer program instructions associated with an active prompt may be considered to provide some indication that the computer program instructions have executed. For example, computer program instructions that record the current time at which the computer program instructions execute provide an indication that the computer program instructions have executed by performing the act of recording the current time.

Use of active prompts facilitates implementation of a variety of features in automated telephony systems. For example, the ability to associate computer program instructions with an active prompt, combined with the ability to insert active prompts at known positions in a prompt stream, facilitates implementation of features which are difficult and time-consuming to implement in conventional telephony systems that are based on the prompt queue model. The following are examples of a number of features implemented using active prompts. Such examples are provided merely for purposes of illustration and do not constitute limitations of the present invention. Other applications of active prompts will be apparent to those skilled in the art.

In one embodiment of the present invention, active prompts are used to determine whether a voice prompt in a prompt stream has played in its entirety. Making such a determination may be useful, for example, when it is necessary to determine that a particular prompt or series of prompts has been played to the user without barge-in or hangup. For example, it may be desirable to confirm that a critical message (such as a message notifying the user of a weather emergency) or a legal notice (such as a message notifying the user that the subsequent conversation is subject to specified legal restrictions) has been played to the user in its entirety.

Figure 4A:
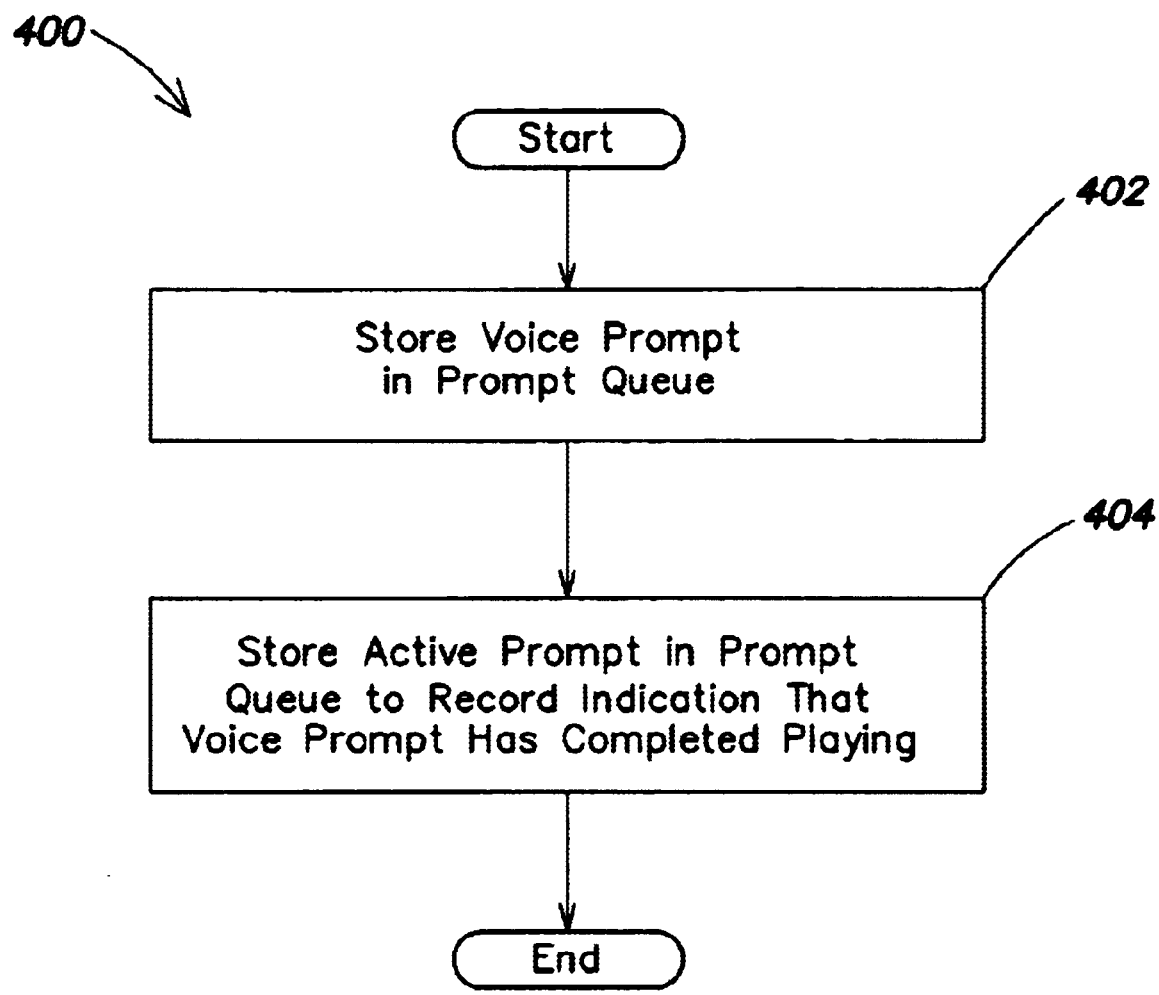
FIG. 4A is a flow chart of a method for generating a prompt stream including a voice prompt whose complete playback can be later verified according to one embodiment of the present invention.

Referring to FIG. 4A, in one embodiment of the present invention the application program 102 uses a method 400 to store a prompt stream in the prompt queue 106 so that the application program 102 may later verify that a particular voice prompt in the prompt stream has been played to the user in its entirety. The application program 102 stores a voice prompt in the prompt queue 106 (act 402). The voice prompt may, for example, be a critical message or legal notice that the user must hear in its entirety before any other voice prompts are played. The application program 102 stores an active prompt in the prompt queue 106 that, when executed, records an indication that the voice prompt stored in act 402 has been played in its entirety (act 404). The computer program instructions associated with the active prompt may record this indication in any way, such as by setting a flag.

Figure 4B:
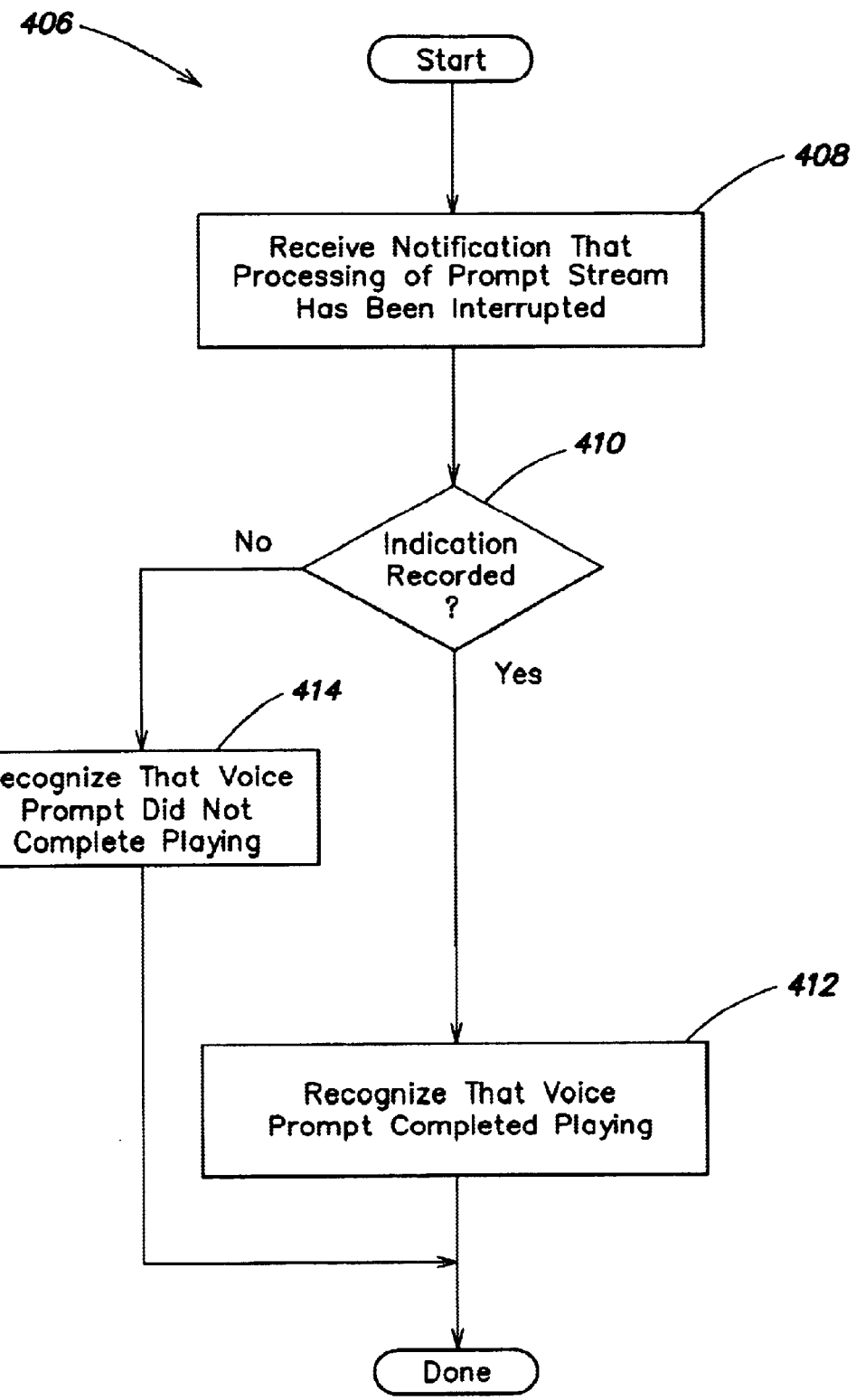
FIG. 4B is a flow chart of a method for determining whether a voice prompt was played in its entirety according to one embodiment of the present invention.

After storing the prompt stream in the prompt queue 106, the application program 102 may instruct the telephony system interface 104 to process the prompt queue 106, as described above with respect to FIG. 2. If the user barges in during processing of the prompt queue 106, the telephony system interface 104 notifies the application program 102 that barge-in has occurred and terminates processing of the prompt queue 106. Referring to FIG. 4B, a method 406 is shown that may be executed by the application program 102 to determine whether the voice prompt stored in act 402 (FIG. 4A) was played in its entirety to the user prior to barge-in. The application program 102 receives notification that barge-in has occurred (act 408), and then determines whether the active prompt stored in act 404 (FIG. 4A) recorded the indication that the voice prompt completed playing (act 410). For example, when the indication is a flag, the application program 102 may examine the flag and determine that the indication was recorded when the flag is set. The application program 102 recognizes that the voice prompt completed playing when the indication has been recorded (act 412), and recognizes that the voice prompt did not complete playing when the indication is determined not to have been recorded (act 414). Because the active prompt stored in act 404 is guaranteed to execute after the voice prompt stored in act 402 has completed playing, the determination of whether the indication was recorded (act 410) may reliably be used to determine whether the voice prompt was played to the user in its entirety. When the application program 102 determines that the voice prompt was not played to the user in its entirety (e.g., because the user barged-in while the voice prompt was playing), the application program 102 may take any appropriate action such as queuing the voice prompt to be played to the user again.

In another embodiment of the present invention, active prompts are used to determine which prompt in the prompt stream was playing when a particular event, such as barge-in, occurred. This can be useful for a variety of reasons. For example, the actions taken by the telephony system 100 in response to barge-in may depend on which prompt was playing or which prompts the user had heard when barge-in occurred. Several examples of such situations and ways in which they may be addressed using active prompts are described in more detail below.

Figure 5A:
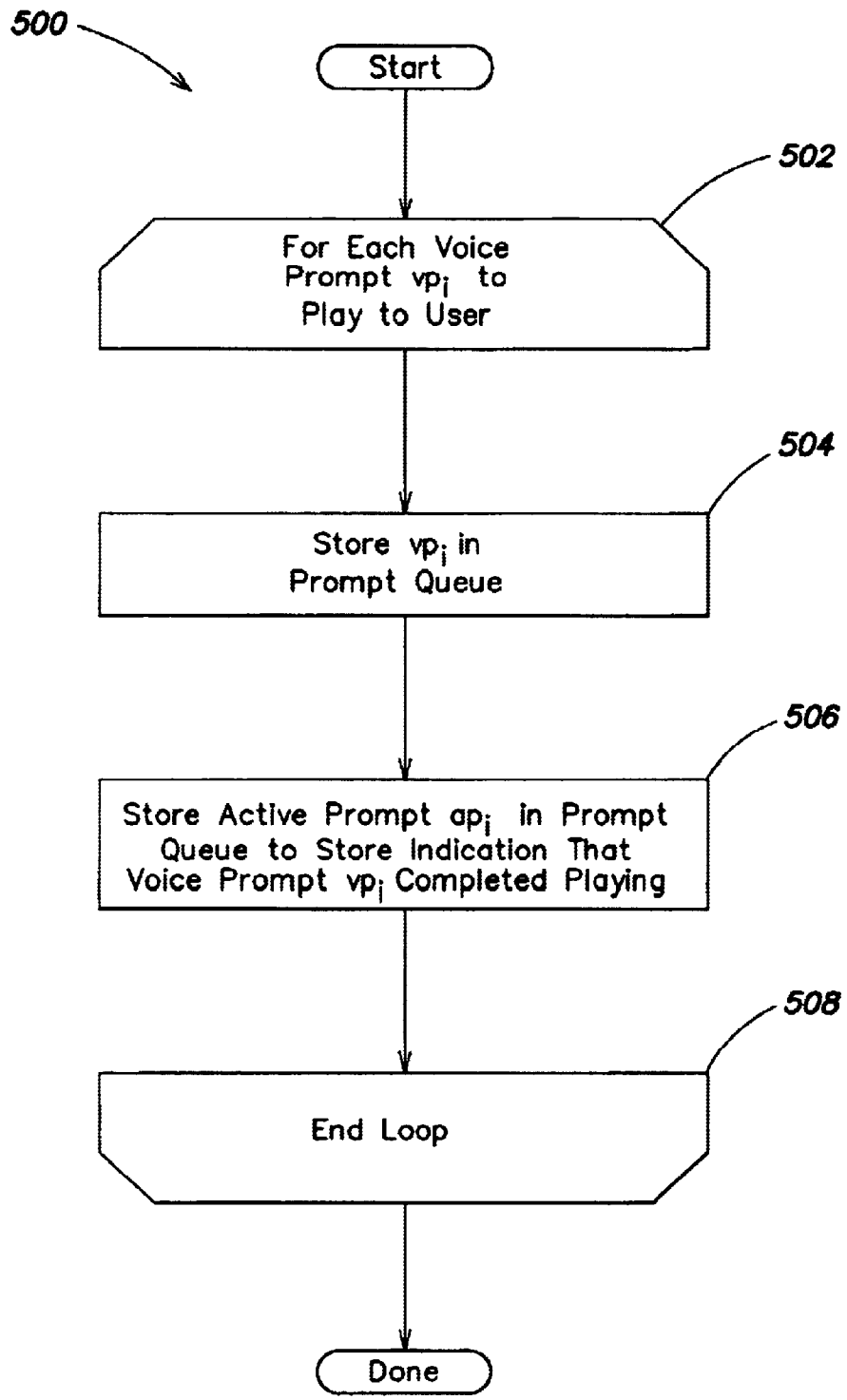
FIG. 5A is a flow chart of a method for generating a prompt stream in a manner that enables an application program to later determine which voice prompt in the prompt stream was playing at the time an event occurred according to one embodiment of the present invention.

Referring to FIG. 5A, in one embodiment of the present invention the application program 102 uses a method 500 to store a prompt stream in the prompt queue 106 so that the application program 102 can later determine which voice prompt in the prompt stream was playing at the time an event (e.g., barge-in) occurred. The application program 102 loops over each voice prompt $vp_i$ to play to the user, where i ranges from 1 to the number of voice prompts to play to the user (act 502). The application program 102 stores the voice prompt $vp_i$ in the prompt queue 106 (act 504). The application program 102 stores an active prompt $ap_i$ in the prompt queue 106 to store an indication that the voice prompt $vp_i$ completed playing (act 506). The acts 504 and 506 are repeated for the remaining voice prompts to play to the user (act 508).

Figure 5B:
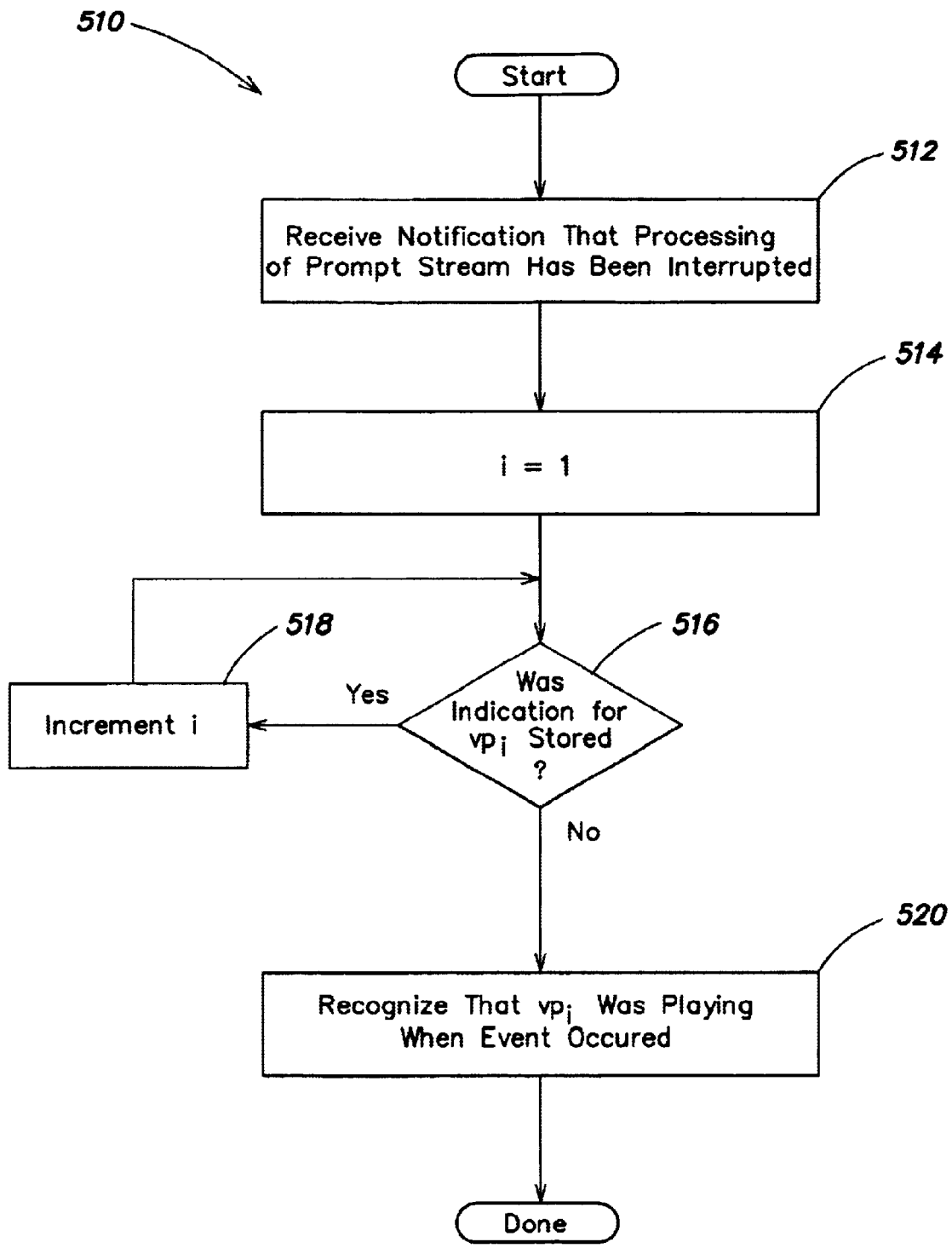
FIG. 5B is a flow chart of a method that may be executed by an application program to determine which voice prompt in the prompt stream was playing at the time an event occurred according to one embodiment of the present invention.

After storing the prompt stream in the prompt queue 106, the application program 102 may instruct the telephony system interface 104 to process the prompt queue 106, as described above. If the user barges in during processing of the prompt queue 106, the telephony system interface 104 notifies the application program 102 that barge-in has occurred and terminates processing of the prompt queue 106. Referring to FIG. 5B, a method 510 is shown that may be executed by the application program 102 to determine which voice prompt in the prompt stream stored by the method 500 of FIG. 5A was playing at the time the event (e.g., barge-in) occurred. The application program 102 receives notification that an external event has occurred (act 512). The application program 102 initializes a counter variable i to a value of one (act 514). The application program 102 determines whether an indication for the voice prompt $vp_i$ was stored (act 516). As described above with respect to FIG. 5A, the voice prompt $vp_i$ was followed in the prompt queue 106 by an active prompt $ap_i$ that was associated with computer program instructions to store an indication that voice prompt $vp_i$ was played in its entirety. Because active prompt $ap_i$ follows voice prompt $vp_i$ in the prompt queue 106, active prompt $ap_i$ is guaranteed to execute (and store the indication for $vp_i$) only after voice prompt $vp_i$ has completed playing. Therefore, if processing of the prompt queue 106 has been interrupted and the indication for voice prompt $vp_i$ has been stored, then the voice prompt $vp_i$ had completed playing when processing of the prompt queue 106 was interrupted. Therefore, if the indication for voice prompt $vp_i$ has been stored, it indicates that voice prompt $vp_i$ must have completed playing, such that $vp_i$ could not have been playing when processing of the voice queue 106 was interrupted. Therefore, the application program 102 continues to examine the voice prompts in the voice queue 106 by incrementing the counter variable i (act 518) and repeating act 516.

When the application program 102 identifies the first voice prompt $vp_i$ whose indication was not stored (act 516), the application program 102 recognizes that the voice prompt $vp_i$ was playing when the event occurred (act 520). The identified voice prompt is the first voice prompt in the prompt queue 106 for which no indication was stored. Therefore, the identified voice prompt is the voice prompt that was playing when the event occurred.

The ability to identify the voice prompt that was playing when a particular event occurred is useful in a variety of situations. For example, assume that the application program 102 generates a prompt stream which says to the user "Press one when you hear the name of your city," followed by a list of city names (e.g., "Boston, Chicago, New York, Miami, Los Angeles"). Assume that the telephony system interface 104 returns control to the application program 102 when the user presses the "1" key on the telephone keypad. In one embodiment of the present invention, the application program 102 uses a process 510 shown in FIG. 5B to determine which city name was being played at the time the user presses the "1" key. Recordings are made of each of the city names followed by a short pause. Each such recorded city name is recorded in the prompt queue 106 as a distinct voice prompt. After each voice prompt in the prompt queue 106 is an active prompt that stores an indication that the corresponding voice prompt (a city name) has been played in its entirety. With the prompt queue 106 arranged in this manner, the process 510 shown in FIG. 5B may be used to determine which voice prompt (and therefore, which city name or subsequent pause) was being played when barge-in occurred.

Figure 6:
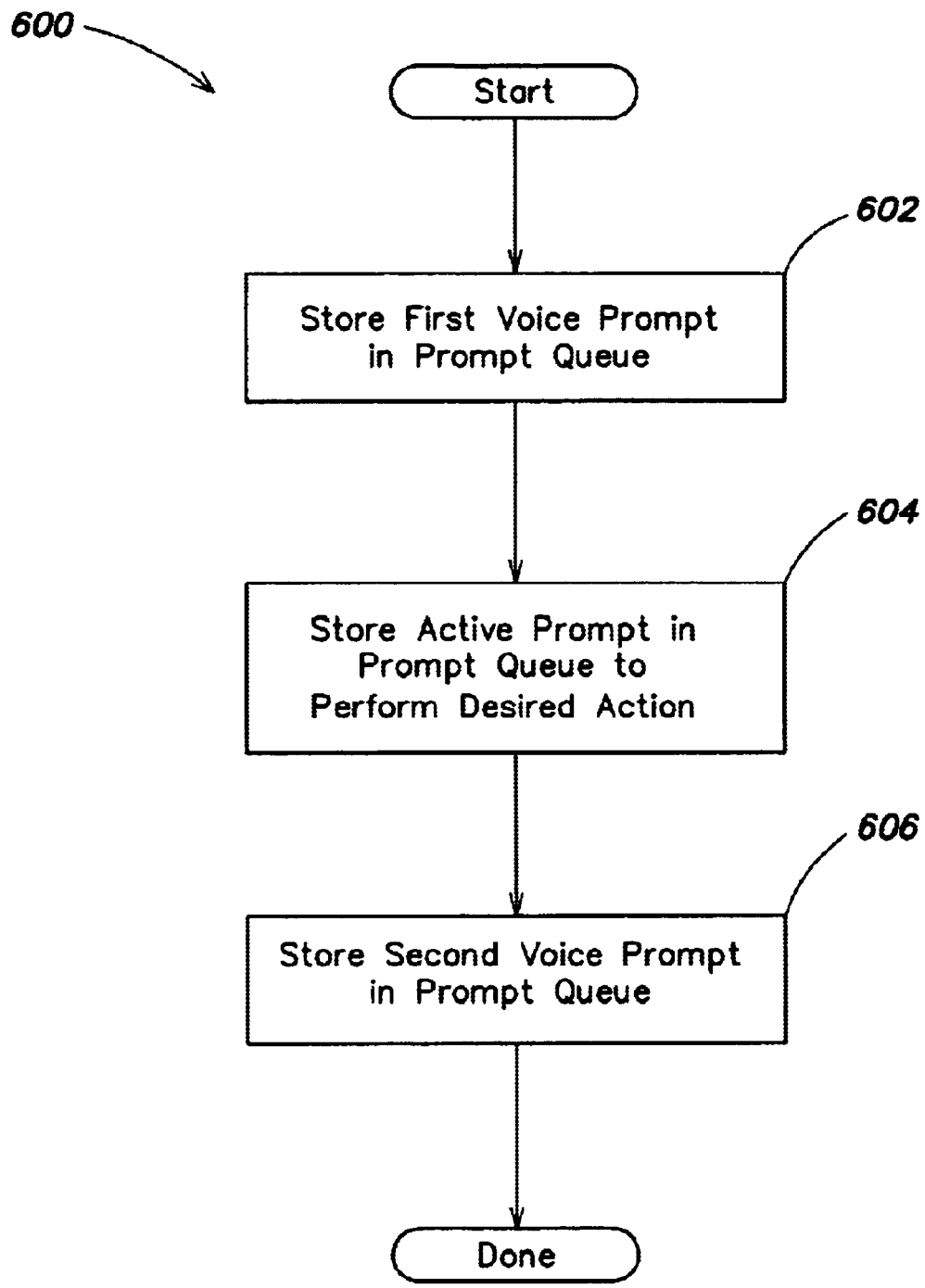
FIG. 6 is a flow chart of a method for generating a prompt stream including an active prompt to perform an action at the predetermined time according to one embodiment of the present invention.

In another embodiment of the present invention, active prompts are used to perform an action at a specified instant during processing of the prompt queue 106, even when no barge-in or other external event has occurred. To perform the action at the desired instant, the application program 102 stores an active prompt associated with computer program instructions to perform the action in the prompt queue 106 at a location corresponding to the specified instant. For example, referring to FIG. 6, in one embodiment of the present invention, the application program 102 uses a method 600 to store an active prompt associated with computer program instructions to perform an action after playing a first voice prompt and before playing a second voice prompt. The application program stores the first voice prompt in the prompt queue (act 602), followed by the active prompt to perform the desired action (act 604), followed by the second voice prompt (act 606). This guarantees that when the telephony system interface 104 processes the prompt queue 106, the desired action will be performed after the first voice prompt is played and before the second voice prompt is played.

For example, in one embodiment of the present invention active prompts are used to start a timer at a precise instant, such as a timer started for billing purposes at the point in time when the user begins hearing billable information. For example, referring again to FIG. 6, the application program 102 may store in the prompt queue a first voice prompt saying "Billing will begin at the sound of the beep <beep>" (where <beep> indicates the sound of a beep) (act 602), followed by an active prompt associated with computer program instructions that start the timer (act 604), followed by a second voice prompt containing spoken information for which the user is billed (act 606). Another example in which this technique may be used is that of resources that the application program 102 needs to acquire during processing of the prompt queue 106 (e.g., licenses that are legally required to be held while music is being played), and which are desirable to be released as soon as possible. Such a capability may be implemented by inserting an active prompt into the prompt queue 106 at the point where the resources need to be acquired/released. Execution of the computer program instructions associated with such an active prompt causes the resources to be acquired/released. A further example is that of a computationally-intensive activity which must begin executing before the end of the prompt stream so that the activity completes on time.

In a further embodiment of the present invention, active prompts are used to modify the state of the telephony system 100 at a specified point in the prompt stream. To modify the state of the telephony system 100 at a specified point in the prompt stream, an active prompt associated with computer program instructions that perform the desired modification of the telephony system's state is stored in the prompt queue 106 at the point where the state change should take place, as described above with respect to act 604 of FIG. 6. For example, active prompts may be used in this way to consecutively play a stream of messages, each having its own speech recognition grammar. For example, if a first message is associated with a first grammar and a second message is associated with a second grammar, the application program 102 may store the following prompts in the prompt queue 106 in the following order: (1) an active prompt that changes the grammar of the speech recognition engine 118 to the first grammar, (2) a voice prompt corresponding to the first message, (3) an active prompt that changes the grammar of the speech recognition engine 118 to the second grammar, and (4) a voice prompt corresponding to the second message. Because the active prompts are guaranteed to execute at the points in time corresponding to their positions in the prompt queue 106, the speech recognition engine's grammar is guaranteed to changed at the correct times during processing of the prompt queue 106.

In another embodiment of the present invention, active prompts are used to impose a structure, such as a hierarchical structure, on a prompt stream. Such a structure may be used to facilitate implementation of a variety of features. For example, the telephony system 100 may be used to play long messages (e.g., email messages) containing many sentences and/or paragraphs. When playing such messages, it is desirable to provide the user with the ability to issue commands such as "back up to the beginning of the sentence," "back up to the beginning of the paragraph," and "skip to the next paragraph," during message playback. To implement such commands, the message may be broken into voice prompts corresponding to structural elements of the message, such as words, sentences, and paragraphs. Active prompts may be inserted into the prompt stream before each voice prompt identifying a structural element to which the voice prompt corresponds. The computer program instructions associated with each such active prompt may, for example, record information indicating which structural element (e.g., which sentence in the message) is about to be played. When a user issues a command, such as "back up to the previous sentence," the application program 102 may use the information recorded by the previous sentence's active prompt to back up to the previous sentence.

Figure 7:
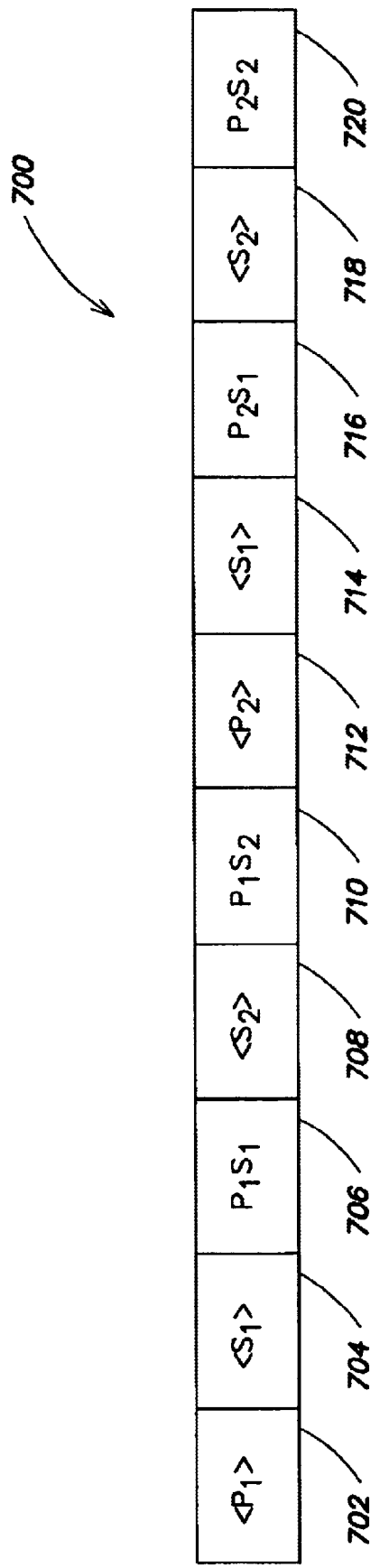
FIG. 7 is a block diagram of a prompt stream representing a message and including active prompts corresponding to structural elements of the message according to one embodiment of the present invention.

For example, referring to FIG. 7, a block diagram of an example of a prompt stream 700 is shown corresponding to two paragraphs of spoken text, each of which contains two sentences. For purposes of example, the paragraphs have been subdivided into sentences. It should be appreciated, however, that the paragraphs could be further subdivided into words and that the text may be subdivided or organized in any other manner.

As shown in FIG. 7, the prompt stream 700 includes a plurality of prompts 702–720, including both active prompts 702, 704, 708, 712, 714 and 718, and voice prompts 706, 710, 716, and 720. The active prompt 702 marks the beginning of the first paragraph in the prompt stream. The identifier of the active prompt 702 is therefore illustrated in FIG. 7 as <$P_1$>, where the angled brackets indicate that the prompt 702 is an active prompt, the "P" indicates that the active prompt marks a paragraph, and the "1" indicates that the paragraph is the first paragraph in the prompt stream 700. The computer program instructions associated with the active prompt 702 may record an indication that the succeeding voice prompt 706 is at the beginning of the first paragraph in any of a variety of ways. For example, the application program 102 may maintain a "current paragraph" variable that stores a numerical identifier of the paragraph currently being played to the user. The active prompt 702 may assign the "current paragraph" variable a value of one to indicate that the first paragraph in the prompt stream 700 is currently being played to the user.

Similarly, the identifier of the active prompt 704 is illustrated in FIG. 7 as <$S_1$>, to indicate that the succeeding voice prompt 706 is the first sentence of the current paragraph. The voice prompt 706 is illustrated as $P_1S_1$, indicating that the voice prompt 706 is the first sentence of the first paragraph of the prompt stream 700. The identifier $P_1S_1$ is illustrated without angled brackets to indicate that the prompt 706 is a voice prompt rather than an active prompt. The voice prompt 706 is associated with a digital audio stream corresponding to the first sentence of the first paragraph of the message to be played to the user. The remaining prompts in the prompt stream 700 similarly represent the remaining sentences and paragraphs of the message to be played to the user.

It should be apparent that at any particular time while the prompt stream 700 is being played to the user, the application program 102 will be able to determine which paragraph and sentence of the message is being played to the user. For example, if the application program maintains "current paragraph" and "current sentence" variables that, as described above, store numerical identifiers of the current paragraph and sentence being played as the prompt stream 700 is being played to the user, the application program 102 may determine which paragraph and sentence are being played to the user by examining the values of these variables. If the user barges in with a command such as "back up to the beginning of the sentence," the application program 102 may determine which sentence was being played to the user when the user issued the command. The application program 102 may then insert into the prompt queue 106 (which will have been cleared by the barge in) the voice prompt corresponding to the current sentence and succeeding prompts, and then play the prompt queue 106 to the user.

Insertion of active prompts within a prompt stream may be used to allow the user to navigate through a prompt stream in a variety of other ways. For example, active prompts may be used to implement "fast forward" and "rewind" commands. In one embodiment of the present invention, active prompts are inserted throughout a prompt stream, such as between each word in the prompt stream. When a user issues a "fast forward" command, the application program 102 interrupts processing of the prompt stream, skips ahead in the prompt stream by a predetermined number of active prompts, and resumes processing of the prompt stream. The "rewind" command is implemented similarly by skipping backward by a predetermined number of active prompts.

It should be appreciated that the prompt stream 700 shown in FIG. 7 is merely one example of a way in which active prompts may be used to identify structure within a message, and that other ways of performing this function will be apparent to those skilled in the art. Although in FIG. 7 active prompts are positioned before the voice prompts with which they are associated, active prompts may be positioned in any appropriate manner, such as after the voice prompts with which they are associated or both before and after the voice prompts with which they are associated.

As should be appreciated from the foregoing, active prompts have a number of benefits and advantages. For example, a telephony system incorporating active prompts, such as the telephony system 100, maintains the simplicity of the traditional prompt queue model, while at the same time facilitating solutions of a variety of problems associated with the traditional prompt queue model. For example, the traditional prompt queue model allows an application programmer to play a stream of prompts merely by sequentially placing the prompts on the prompts queue, and then instructing the system to play the prompts in the queue. According to this model, the application programmer need not know the length of each prompt in the prompt stream or the time at which any particular part of the prompt stream is being played. This provides the advantage that the application programmer need only be concerned with the contents of the prompt stream and not be concerned with the details of converting the prompts in the prompt stream into playable audio streams. This very aspect of the traditional prompt queue, however, produces a corresponding disadvantage— an application programmer who needs to know the precise time at which particular audio within the prompt stream is played is unable to do so easily or reliably. Introduction of active prompts associated with computer program instructions allows the application programmer to continue programming according to the traditional prompt queue model and to therefore continue to obtain all of the benefits of that model. Introduction of active prompts, however, eliminates many of the disadvantages of the traditional prompt queue model described above, within the framework of the prompt queue model. Active prompts are, therefore, easy to use for programmers who are familiar with the traditional prompt queue model. Furthermore, systems incorporating prompt markers maintain backward compatibility with traditional systems.

One aspect of the ease of use of active prompts is that the application program may store active prompts in a prompt queue in the same manner in which it places traditional voice prompts in the prompt queue. For example, referring again to FIG. 1, the telephony system interface 104 may provide an "add prompt to queue" command that allows the application program 102 to add a prompt—whether it be a voice prompt or an active prompt—to the prompt queue 106. This virtually eliminates the need for the application programmer who is familiar with the traditional prompt queue model to learn anything new to use active prompts. It should be appreciated that the present invention is not limited to any particular implementation for the manner in which the prompts are stored in the prompt queue 106 (FIG. 1). For example, the prompt queue can store the actual data that makes up the prompts, or can simply include pointers to memory locations wherein that data is stored.

A further advantage of active prompts is that they may be associated with any computer program instructions to perform any function. As a result, active prompts are extremely flexible and are not limited to performing functions that are provided by the telephony system interface 104 or any other component of the telephony system 100. Active prompts may, of course, include computer program instructions that access features provided by components of the telephony system 100, such as the telephony system interface 104 or the speech recognition engine 118, or could change a display coupled to the telephony system using HTML. For example, active prompts may be associated with computer program instructions to instruct the telephony system interface 104 to turn barge-in on or off. In addition, active prompts may be associated with instructions to alter the contents of the prompt queue 106 (e.g., by providing instructions to telephony system interface 104 to do so). The contents of the prompt queue can be altered in any of numerous ways, e.g., by terminating processing of the prompt queue, or by adding additional prompts (either active or voice) into the prompt queue either in the place in the queue occupied by the active prompt or somewhere else in the queue. In this respect, active prompts can add additional prompts at the end of the prompt queue, or in the middle (i.e., anywhere other than the end) thereof. As a result, active prompts may be used to control components of the telephony system 100 at precisely specified points within the prompt stream, as described above. This ability greatly facilitates implementation of features which require, for example, the state of the telephony system to be modified at a particular point during processing of the prompt queue 106.

The embodiments described above are provided merely for purposes of example and are not intended to constitute limitations of the present invention. Various other uses for active prompts are possible, and the present invention is not limited to those explicitly described above, as the computer program instructions associated with an active prompt can perform any function desired by the programmer.

The computer program instructions that are associated with an active prompt may be any kind of computer program instructions. For example, the computer program instructions may be in the form of source code, object code, dynamic link libraries, tokens, or any combination thereof. The computer program instructions may be written in any computer language or derived from computer program instructions written in any computer language, such as assembly language, BASIC, FORTRAN, Pascal, C, C++, Java, Ada, Lisp, or COBOL. Although the data structure 306 corresponding to an active prompt shown in FIG. 3B is illustrated as containing computer program instructions 310, a data structure representing an active prompt may be associated with computer program instructions in any manner, such as by containing (1) the computer program instructions, (2) a pointer to the computer program instructions, or (3) code for generating the computer program instructions.

An active prompt may be represented in any of a variety of forms. For example, an active prompt may be represented as a data structure in a computer-readable memory, such as the data structure 306 shown in FIG. 3B. An active prompt may also be represented as an object according to an object-oriented programming language. Such an object may include or refer to data (such as the active prompt identifier 308 and the computer program instructions 310) and may also include or refer to computer program instructions for performing specified functions. The active prompt identifier 308 may be any kind of identifier, such as a numerical identifier, a textual identifier, or an object. Although the data structure 306 shown in FIG. 3B includes the active prompt identifier 308 for identifying the data structure 306 as an active prompt, use of the active prompt identifier 308 is provided purely for purposes of example and is not required. Rather, any means may be used for identifying a prompt as an active prompt. Although FIG. 3B shows a data structure representing an active prompt, an active prompt need not be represented by a data structure. Rather, an active prompt may be a set of computer program instructions stored directly in the prompt queue 106 without an encapsulating data structure.

Although, as described elsewhere herein, a distinguishing feature of an active prompt is that it is associated with computer program instructions, an active prompt may include or refer to data (e.g., audio files) or procedures in addition to computer program instructions. For example, an active prompt may include the active prompt identifier 308, as shown in FIG. 3B.

Although, in the description above, the prompt queue 106 is described for storing prompts in a prompt stream prior to processing the prompts, storage of prompts in the prompt queue 106 or other storage medium prior to processing is not required. Prompts may, for example, be processed as they are generated without first being stored. As a result, references in the description above to storing prompts in the prompt queue 106 and to processing the prompt queue 106 are equally applicable to processing a stream of prompts that are not stored in the prompt queue 106 or other storage medium. Even if prompts in a prompt stream are stored prior to being processed, at least some prompts in the prompt stream may be processed before all of the prompts in the prompt stream have been stored. Furthermore, although in the description above prompts are described as being processed in the order in which they are generated and stored in the prompt queue 106, the present invention is not so limited.

The illustrative embodiments of the present invention discussed above have been described in connection with the illustrative system shown in FIG. 1. However, it should be appreciated that the present invention is not limited in this respect, and that the aspects of the present invention described above can be used in connection with computer systems having numerous other configurations capable of controlling a telephony system. In addition, while discussed above in connection with a telephony system, the embodiments of the present invention described herein are not limited to use with a telephony system, and can be used in connection with numerous other types of systems employing audio and/or video prompt, such that active prompts can be employed with prompt streams including any type of video prompt and/or audio prompt in addition to the voice prompts discussed above.

It should be understood that the present invention is not limited to use with any particular computer platform, computer processor, or high-level programming language. Although aspects of the present invention, such as the application program 102 and the telephony system interface 104 may be implemented as computer programs executable by a computer processor, elements of the invention may be implemented in software, hardware, firmware, or any combination thereof. The various elements of the invention, either individually or in combination, may be implemented as a computer program product tangibly embodied in a machine-readable storage medium for execution by a computer processor. In this respect, it should be appreciated that all of the components of the telephony system 100 shown in FIG. 1 and their sub-components can be generically considered as controllers, such that the telephony system 100 can be provided with at least one controller to perform the functions described above. These functions can be performed by a single controller, or can be distributed amongst multiple controllers in the manner described above.

Various acts of embodiments of the invention, such as those described above and illustrated using flow charts, may be performed by a computer processor executing a program (i.e., software or firmware) tangibly embodied on a computer-readable medium to perform functions by operating on input and generating output. The computer-readable medium may, for example, be a memory accessible to the CPU 130 (FIG. 1), or a transportable medium such as a compact disk, a floppy disk, or a diskette, such that a computer program embodying the aspect of the present invention can be loaded onto any computer. The computer program is not limited to any particular implementation and may, for example, include an application program, foreground or background process, driver, or any combination thereof, executing on a single computer processor or multiple computer processors. Computer programming languages suitable for implementing such a system include procedural programming languages, object-oriented programming languages, and any combination thereof.

Having described several embodiments of the invention in detail, various modifications and improvement will readily occur to those skilled in the art. Such modifications and improvements are intended to be within the spirit and scope of the invention. Accordingly, the foregoing description is by way of example only, and is not intended as limiting. The invention is limited only as defined by the following claims and the equivalents thereto.

What is claimed is:

1. A method for use in a telephony system comprising an application program and a telephony system interface that provides an interface to enable the application program to construct a prompt queue comprising a plurality of prompts, wherein the telephony system interface further enables the playing back of the prompts over a telephone line when the prompt queue is processed by the telephony system interface by sequentially processing the prompts in the prompt queue, the method comprising acts, executed by the application program, of:

(A) inserting into the prompt queue at least one voice prompt to be played to a user of the telephony system when the prompt queue is processed by the telephony system interface; and (B) inserting into the prompt queue at least one active prompt associated with computer program instructions to be executed when the prompt queue is processed by the telephony system interface.

2. The method of claim 1, further including an act of:

inserting the at least one voice prompt and the at least one active prompt into the prompt queue in an order in which the at least one voice prompt and the at least one active prompt are to be processed.

3. The method of claim 1, wherein:

the act (A) comprises an act of: (A)(1) inserting into the prompt stream a first voice prompt associated with a first audio stream, and wherein:

the act (B) comprises an act of: (B)(1) inserting into the prompt stream after the first voice prompt a first active prompt associated with computer program instructions to provide a first indication that the first active prompt has executed.

4. The method of claim 3, further comprising an act of:

(C) inserting into the prompt stream after the first active prompt a second voice prompt associated with a second audio stream.

5. The method of claim 4, further comprising acts of:

(D) instructing the telephony system to process the prompt stream; and (E) in response to an event that terminates processing of the prompt stream, determining whether the first voice prompt was played to the user in its entirety based on whether the first indication indicates that the first active prompt was executed.

6. The method of claim 4, further comprising acts of:

(D) inserting into the prompt stream after the second voice prompt a second active prompt associated with computer program instructions to provide a second indication that the second active prompt has executed;

(E) instructing the telephony system to process the prompt stream;

(F) in response to an event that terminates processing of the prompt stream, determining that the event occurred while the second voice prompt was being played to the user, when it is determined that the first indication has been provided and the second indication has not been provided.

7. The method of claim 3, further comprising acts of:

(C) instructing the telephony system to process the prompt stream;

(D) determining whether the first indication has been provided;

(E) determining that the first voice prompt has been played to the user in its entirety when it is determined in the act (D) that the first indication has been provided.

8. The method of claim 1, wherein the act (B) comprises an act of:

(B)(1) inserting into the prompt stream an active prompt associated with computer program instructions to record a time at which the active prompt is processed.

9. The method of claim 8, further comprising acts of:

(C) instructing the telephony system to process the prompt stream; and (D) determining the time at which the active prompt was processed by examining the recorded time.

10. The method of claim 1, wherein the act (A) comprises an act of:

(A)(1) inserting into the prompt stream a plurality of voice prompts associated with a plurality of audio streams to be played to the user of the telephony system; and wherein the act (B) comprises an act of:

(B)(1) inserting a plurality of active prompts each associated with computer program instructions to record a time at which the computer program instructions are executed, each of the plurality of active prompts being disposed between pairs of the plurality of voice prompts.

11. The method of claim 10, further comprising acts of:

(C) instructing the telephony system to process the prompt stream;

(D) receiving a notification of an occurrence of an event;

(E) receiving from the telephony system an indication of an elapsed time of a current voice prompt in the prompt stream that was playing when the event occurred;

(F) retrieving a recorded time at which the computer program instructions associated with the active prompt preceding the current voice prompt were executed; and (G) adding the elapsed time to the recorded time to determine a time at which the event occurred.

12. The method of claim 1, wherein the act (B) comprises an act of:

(B)(1) inserting into the prompt stream an active prompt associated with computer program instructions to start a timer when the active prompt is processed.

13. The method of claim 12, further comprising acts of:

(C) instructing the telephony system to process the prompt stream;

(D) receiving notification of an occurrence of an event; and (E) determining an amount of time between processing of the active prompt and the occurrence of the event by examining the timer.

14. The method of claim 1, wherein the act (B) comprises an act of:

(B)(1) inserting into the prompt stream an active prompt associated with computer program instructions to modify a state of the telephony system.

15. The method of claim 14, wherein the act (B)(1) comprises an act of:

inserting into the prompt stream an active prompt associated with computer program instructions to modify a current grammar of a speech recognition engine associated with the telephony system.

16. The method of claim 14, wherein the act (B) comprises an act of:
   inserting into the prompt stream an active prompt associated with computer program instructions to modify contents of the prompt stream.

17. The method of claim 1, wherein the prompt stream includes voice prompts comprising a message including structural elements, and wherein the act (B) comprises an act of:
   (B)(1) inserting into the prompt stream a plurality of active prompts between the structural elements of the message, each of the plurality of active prompts being associated with computer program instructions to provide an indication that the active prompt has executed.

18. The method of claim 17, further comprising acts of:
   (C) instructing the telephony system to process the prompt stream;
   (D) receiving notification of a user request to reposition processing of the prompt stream within the message; and
   (E) determining where in the message the request was received based on which of the plurality of active prompts have been executed.

19. The method of claim 18, wherein:
   the act (D) comprises an act of: receiving notification from a user to re-play one of the voice prompts corresponding to a previously played structural element of the message; and
   further comprising an act of: (F) re-playing the one of the voice prompts corresponding to the previously played structural element of the message to the user.

20. The method of claim 18, wherein:
   the act (D) comprises an act of: receiving notification from a user to play one of the voice prompts corresponding to an unplayed structural element of the message; and
   further comprising an act of: (F) playing the one of the voice prompts corresponding to the unplayed structural element of the message to the user.

21. A method for processing a prompt queue in a telephony system comprising an application program and a telephony system interface that provides an interface to enable the application program to construct the prompt queue, wherein the prompt queue comprises a plurality of prompts, wherein the telephony system interface further enables the playing back of the prompts over a telephone line when the prompt queue is processed by the telephony system interface by sequentially processing the prompts in the prompt queue, the method comprising acts executed by the telephony system interface, of:
   (A) playing a first audio stream associated with a first voice prompt in the prompt queue; and
   (B) executing computer program instructions associated with at least one active prompt in the prompt queue.

22. The method of claim 21, wherein the first voice prompt and the at least one active prompt are disposed in an order in the prompt queue, and wherein the acts (A) and (B) are performed in the order in which the voice prompt and the at least one active prompt are disposed in the prompt queue.

23. The method of claim 21, wherein the at least one active prompt in the prompt stream is associated with computer program instructions to provide an indication that the active prompt has executed, and wherein the act (B) comprises an act of:
   (B)(1) executing the computer program instructions associated with the at least one active prompt in the prompt stream to provide the indication that the active prompt has executed.

24. The method of claim 21, wherein the act (B) comprises an act of:
   (B)(1) executing the computer program instructions associated with the at least one active prompt to record a time at which the at least one active prompt was executed.

25. The method of claim 21, wherein the act (B) comprises an act of:
   (B)(1) executing the computer program instructions associated with the at least one active prompt to start a timer.

26. The method of claim 21, wherein the act (B) comprises an act of:
   (B)(1) executing the computer program instructions to modify a state of the telephony system.

27. The method of claim 26, wherein the act (B)(1) comprises an act of:
   executing the computer program instructions to modify a current grammar of a speech recognition engine associated with the telephony system.

28. The method of claim 26, wherein the act (B) comprises an act of executing the computer program instructions to modify contents of the prompt stream.

29. A computer-readable medium encoded with a program for execution on a telephony system comprising an application program and a telephony system interface that provides an interface to enable the application program to construct a prompt queue comprising a plurality of prompts, wherein the telephony system interface further enables the playing back of the prompts over a telephone line when the prompt queue is processed by the telephony system interface by sequentially processing the prompts in the prompt queue, the program, when executed on the telephony system, performs a method comprising acts of:
   (A) inserting into the prompt queue at least one voice prompt to be played to a user of the telephony system when the prompt queue is processed by the telephony system interface; and
   (B) inserting into the prompt queue at least one active prompt associated with computer program instructions to be executed when the prompt queue is processed by the telephony system interface.

30. The computer-readable medium of claim 29, wherein the method further includes an act of:
   inserting the at least one voice prompt and the at least one active prompt into the prompt queue in an order in which the at least one voice prompt and the at least one active prompt are to be processed.

31. The computer-readable medium of claim 29, wherein:
   the act (A) comprises an act of: (A)(1) inserting into the prompt stream a first voice prompt associated with a first audio stream, and wherein:
   the act (B) comprises an act of: (B)(1) inserting into the prompt stream after the first voice prompt a first active prompt associated with computer program instructions to provide a first indication that the first active prompt has executed.

32. The computer-readable medium of claim 31, wherein the method further comprises an act of:
   (C) inserting into the prompt stream after the first active prompt a second voice prompt associated with a second audio stream.

33. The computer-readable medium of claim 32, wherein the method further comprises acts of:
   (D) instructing the telephony system to process the prompt stream; and (E) in response to an event that terminates processing of the prompt stream, determining whether the first voice prompt was played to the user in its entirety based on whether the first indication indicates that the first active prompt was executed.

34. The computer-readable medium of claim 32, wherein the method further comprises acts of:
(D) inserting into the prompt stream after the second voice prompt a second active prompt associated with computer program instructions to provide a second indication that the second active prompt has executed;
(E) instructing the telephony system to process the prompt stream;
(F) in response to an event that terminates processing of the prompt stream, determining that the event occurred while the second voice prompt was being played to the user, when it is determined that the first indication has been provided and the second indication has not been provided.

35. The computer-readable medium of claim 31, wherein the method further comprises acts of:
(C) instructing the telephony system to process the prompt stream;
(D) determining whether the first indication has been provided;
(E) determining that the first voice prompt has been played to the user in its entirety when it is determined in the act (D) that the first indication has been provided.

36. The computer-readable medium of claim 29, wherein the act (B) comprises an act of:
(B)(1) inserting into the prompt stream an active prompt associated with computer program instructions to record a time at which the active prompt is processed.

37. The computer-readable medium of claim 36, wherein the method further comprises acts of:
(C) instructing the telephony system to process the prompt stream; and
(D) determining the time at which the active prompt was processed by examining the recorded time.

38. The computer-readable medium of claim 29, wherein the act (A) comprises an act of:
(A)(1) inserting into the prompt stream a plurality of voice prompts associated with a plurality of audio streams to be played to the user of the telephony system; and
wherein the act (B) comprises an act of:
(B)(1) inserting a plurality of active prompts each associated with computer program instructions to record a time at which the computer program instructions are executed, each of the plurality of active prompts being disposed between pairs of the plurality of voice prompts.

39. The computer-readable medium of claim 38, wherein the method further comprises acts of:
(C) instructing the telephony system to process the prompt stream;
(D) receiving a notification of an occurrence of an event;
(E) receiving from the telephony system an indication of an elapsed time of a current voice prompt in the prompt stream that was playing when the event occurred;
(F) retrieving a recorded time at which the computer program instructions associated with the active prompt preceding the current voice prompt were executed; and
(G) adding the elapsed time to the recorded time to determine a time at which the event occurred.

40. The computer-readable medium of claim 29, wherein the act (B) comprises an act of:
(B)(1) inserting into the prompt stream an active prompt associated with computer program instructions to start a timer when the active prompt is processed.

41. The computer-readable medium of claim 40, wherein the method further comprises acts of:
(C) instructing the telephony system to process the prompt stream;
(D) receiving notification of an occurrence of an event; and
(E) determining an amount of time between processing of the active prompt and the occurrence of the event by examining the timer.

42. The computer-readable medium of claim 29, wherein the act (B) comprises an act of:
(B)(1) inserting into the prompt stream an active prompt associated with computer program instructions to modify a state of the telephony system.

43. The computer-readable medium of claim 42, wherein the act (B)(1) comprises an act of:
inserting into the prompt stream an active prompt associated with computer program instructions to modify a current grammar of a speech recognition engine associated with the telephony system.

44. The computer-readable medium of claim 42, wherein the act (B)(1) comprises an act of:
inserting into the prompt stream an active prompt associated with computer program instructions to modify contents of the prompt stream.

45. The computer-readable medium of claim 29, wherein the prompt stream includes voice prompts comprising a message including structural elements, and wherein the act (B) comprises an act of:
(B)(1) inserting into the prompt stream a plurality of active prompts between the structural elements of the message, each of the plurality of active prompts being associated with computer program instructions to provide an indication that the active prompt has executed.

46. The computer-readable medium of claim 45, wherein the method further comprises acts of:
(C) instructing the telephony system to process the prompt stream;
(D) receiving notification of a user request to reposition processing of the prompt stream within the message; and
(E) determining where in the message the request was received based on which of the plurality of active prompts have been executed.

47. The computer-readable medium of claim 46, wherein:
the act (D) comprises an act of: receiving notification from a user to re-play one of the voice prompts corresponding to a previously played structural element of the message; and
wherein the method further comprises an act of: (F) re-playing the one of the voice prompts corresponding to the previously played structural element of the message to the user.

48. The computer-readable medium of claim 47, wherein:
the act (D) comprises an act of: receiving notification from a user to play one of the voice prompts corresponding to an unplayed structural element of the message; and
wherein the method further comprises an act of: (F) playing the one of the voice prompts corresponding to the unplayed structural element of the message to the user.

49. A computer-readable medium encoded with a program for execution on a telephony system comprising an application program and a telephony system interface that provides an interface to enable the application program to construct a prompt queue comprising a plurality of prompts, wherein the telephony system interface further enables the playing back of the prompts over a telephone line when the prompt queue is processed by the telephony system interface by sequentially processing the prompts in the prompt queue, the program, when executed on the telephony system, performs a method for processing the prompt queue the method comprising acts, executed by the telephony system interface, of:

(A) playing a first audio stream associated with a first voice prompt in the prompt queue; and (B) executing computer program instructions associated with at least one active prompt in the prompt queue.

50. The computer-readable medium of claim 49, wherein the first voice prompt and the at least one active prompt are disposed in an order in the prompt queue, and wherein the acts (A) and (B) are performed in the order in which the voice prompt and the at least one active prompt are disposed in the prompt queue.

51. The computer-readable medium of claim 49, wherein the at least one active prompt in the prompt stream is associated with computer program instructions to provide an indication that the active prompt has executed, and wherein the act (B) comprises an act of:

(B)(1) executing the computer program instructions associated with the at least one active prompt in the prompt stream to provide the indication that the active prompt has executed.

52. The computer-readable medium of claim 49, wherein the act (B) comprises an act of:

(B)(1) executing the computer program instructions associated with the at least one active prompt to record a time at which the at least one active prompt was executed.

53. The computer-readable medium of claim 49, wherein the act (B) comprises an act of:

(B)(1) executing the computer program instructions associated with the at least one active prompt to start a timer.

54. The computer-readable medium of claim 49, wherein the act (B) comprises an act of:

(B)(1) executing the computer program instructions to modify a state of the telephony system.

55. The computer-readable medium of claim 54, wherein the act (B)(1) comprises an act of:

executing the computer program instructions to modify a current grammar of a speech recognition engine associated with the telephony system.

56. The computer-readable medium of claim 54, wherein the act (B)(1) comprises an act of:

executing the computer program instructions to modify contents of the prompt stream.

57. A telephony system comprising:

at least one processor that executes an application program;

a telephony system interface that provides an interface to enable the application program to construct a prompt queue comprising a plurality of prompts, and that plays back the prompts over a telephone line when the prompt queue is processed by the telephony system interface by sequentially processing the prompts in the prompt queue;

a storage device to store the prompt queue; and a controller to insert into the prompt queue at least one voice prompt associated with at least one audio stream to be played to a user of the telephony system when the prompt queue is processed by the telephony interface, and to insert into the prompt queue at least one active prompt associated with computer program instructions to be executed when the prompt queue is processed by the telephony system interface.

58. The telephony system of claim 57, wherein the controller is further adapted to insert the at least one voice prompt and the at least one active prompt into the prompt queue in an order in which the at least one voice prompt and the at least one active prompt are to be processed.

59. The telephony system of claim 57, wherein the controller is further adapted to insert into the prompt stream a first voice prompt associated with a first audio stream, and to insert into the prompt stream after the first voice prompt a first active prompt associated with computer program instructions to provide a first indication that the first active prompt has executed.

60. The telephony system of claim 59, wherein the controller is further adapted to insert into the prompt stream after the first active prompt a second voice prompt associated with a second audio stream.

61. The telephony system of claim 57, wherein the controller is further adapted to insert into the prompt stream an active prompt associated with computer program instructions to record a time at which the active prompt is processed.

62. The telephony system of claim 57, wherein the controller is further adapted to insert into the prompt stream a plurality of voice prompts associated with a plurality of audio streams to be played to the user of the telephony system, and to insert a plurality of active prompts each associated with computer program instructions to record a time at which the computer program instructions are executed, each of the plurality of active prompts being disposed between pairs of the plurality of voice prompts.

63. The telephony system of claim 57, wherein the controller is further adapted to insert into the prompt stream an active prompt associated with computer program instructions to start a timer when the active prompt is processed.

64. The telephony system of claim 57, wherein the controller is further adapted to insert into the prompt stream an active prompt associated with computer program instructions to modify a state of the telephony system.

65. The telephony system of claim 64, wherein the controller is further adapted to insert into the prompt stream an active prompt associated with computer program instructions to modify a current grammar of a speech recognition engine associated with the telephony system.

66. The telephony system of claim 64, wherein the controller is further adapted to insert into the prompt stream an active prompt associated with computer program instructions to modify contents of the prompt stream.

67. The telephony system of claim 57, wherein the storage device is further adapted to store in the prompt stream includes voice prompts comprising a message including structural elements, and wherein the controller is further adapted to insert into the prompt stream a plurality of active prompts between the structural elements of the message, each of the plurality of active prompts being associated with computer program instructions to provide an indication that the active prompt has executed.

68. A telephony system comprising:

at least one processor that executes an application program;

a telephony system interface that provides an interface to enable the application program to construct a prompt queue comprising a plurality of prompts, and that plays back the prompts over a telephone line when the prompt queue is processed by the telephony system interface by sequentially processing the prompts in the prompt queue;

a storage device to store the prompt queue; and a controller to play a first audio stream associated with a first voice prompt in the prompt queue, and to execute computer program instructions associated with at least one active prompt in the prompt queue when the prompt queue is processed by the telephony system interface.

69. The telephony system of claim 68, wherein the first voice prompt and the at least one active prompt are disposed in an order in the prompt queue, and wherein the controller is further adapted to play the first audio stream and execute the computer program instructions in the order in which the first voice prompt and the at least one active prompt are disposed in the prompt queue.

70. The telephony system of claim 68, wherein the at least one active prompt in the prompt stream is associated with computer program instructions to provide an indication that the active prompt has executed, and wherein the controller is further adapted to execute the computer program instructions associated with the at least one active prompt in the prompt stream to provide the indication that the active prompt has executed.

71. The telephony system of claim 68, wherein the controller is further adapted to execute the computer program instructions associated with the at least one active prompt to record a time at which the at least one active prompt was executed.

72. The telephony system of claim 68, wherein the controller is further adapted to execute the computer program instructions associated with the at least one active prompt to start a timer.

73. The telephony system of claim 68, wherein the controller is further adapted to execute the computer program instructions to modify a state of the telephony system.

74. The telephony system of claim 73, wherein the controller is further adapted to execute the computer program instructions to modify a current grammar of a speech recognition engine associated with the telephony system.

75. The telephony system of claim 73, wherein the controller is further adapted to execute the computer program instructions to modify contents of the prompt stream.

76. The method of claim 16, wherein the act (B) comprises an act of inserting into the prompt stream an active prompt associated with computer program instructions to abort processing of the prompt stream when the active prompt is processed.

77. The method of claim 16, wherein the act (B) comprises an act of inserting into the prompt stream an active prompt associated with computer program instructions to insert a new prompt into a middle of the prompt stream when the active prompt is processed.

78. The method of claim 21, wherein the act (B) comprises an act of executing the computer program instructions at a time in the processing of the prompt stream when the at least one active prompt is processed.

79. The method of claim 21, wherein the act (B) comprises an act of executing the computer program instructions to abort processing of the prompt stream when the active prompt is processed.

80. The method of claim 21, wherein the act (B) comprises an act of executing the computer program instructions to insert a new prompt into a middle of the prompt stream when the active prompt is processed.

81. The computer-readable medium of claim 29, wherein the act (B) comprises an act of inserting into the prompt stream an active prompt associated with computer program instructions to abort processing of the prompt stream when the active prompt is processed.

82. The computer-readable medium of claim 29, wherein the act (B) comprises an act of inserting the prompt stream an active prompt associated with computer program instructions to insert a new prompt into a middle of the prompt stream when the active prompt is processed.

83. The computer-readable medium of claim 49, wherein the act (B) comprises an act of executing the computer program instructions at a time in the processing of the prompt stream when the at least one active prompt is processed.

84. The computer-readable medium of claim 49, wherein the act (B) comprises an act of executing the computer program instructions to abort processing of the prompt stream when the active prompt is processed.

85. The computer-readable medium of claim 49, wherein the act (B) comprises an act of executing the computer program instructions to insert a new prompt into a middle of the prompt stream when the active prompt is processed.

86. The telephony system of claim 68, wherein the controller is adapted to execute the computer program instructions at a time in the processing of the prompt stream when the at least one active prompt is processed.

87. The telephony system claim 68, wherein the controller is adapted to execute the computer program instructions to abort processing of the prompt stream when the active prompt is processed.

88. The telephony system claim 68, wherein the controller is adapted to execute the computer program instructions to insert a new prompt into a middle of the prompt stream when the active prompt is processed.

* * * * *